(12) United States Patent
Curran et al.

(10) Patent No.: US 7,092,976 B2
(45) Date of Patent: Aug. 15, 2006

(54) PARALLEL HIGH SPEED BACKUP FOR A STORAGE AREA NETWORK (SAN) FILE SYSTEM

(75) Inventors: Robert J. Curran, West Hurley, NY (US); Daniel L. McNabb, Los Gatos, CA (US); Demetrios K. Michalaros, Lake Katrine, NY (US); Wayne A. Sawdon, San Jose, CA (US); Frank B. Schmuck, Campbell, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/602,156

(22) Filed: Jun. 24, 2003

(65) Prior Publication Data

US 2004/0267838 A1 Dec. 30, 2004

(51) Int. Cl.
*G06F 17/30* (2006.01)
(52) U.S. Cl. ..................................................... 707/204
(58) Field of Classification Search ..................... None
See application file for complete search history.

(56) References Cited

U.S. PATENT DOCUMENTS

| | | | | |
|---|---|---|---|---|
| 5,367,698 A | * | 11/1994 | Webber et al. | 709/203 |
| 5,572,709 A | * | 11/1996 | Fowler et al. | 703/27 |
| 5,664,186 A | | 9/1997 | Bennett et al. | 707/100 |
| 5,689,706 A | * | 11/1997 | Rao et al. | 707/201 |
| 5,761,677 A | | 6/1998 | Senator et al. | 707/203 |
| 5,778,395 A | | 7/1998 | Whiting et al. | 707/204 |
| 5,828,876 A | | 10/1998 | Fish et al. | 707/1 |
| 6,032,216 A | | 2/2000 | Schmuck et al. | 710/200 |

(Continued)

FOREIGN PATENT DOCUMENTS

JP 2002082825 3/2002

OTHER PUBLICATIONS

Leffler et al., "The Design and Implementation of the 4.3 BSD UNIX Operating System," Addison-Wesley Publishing Co., Inc., May 1989, ISBN 0-201-06196-1, Section 7.2, pp. 193-195.

*Primary Examiner*—Diane Mizrahi
(74) *Attorney, Agent, or Firm*—Lawrence D. Cutter, Esq.; Blanche E. Schiller, Esq.; Heslin Rothenberg Farley & Mesiti P.C.

(57) ABSTRACT

File system backups are carried out by first generating a list of inodes including associated inode numbers in inode number order that have changed since the last backup operation. A table which has file names and inode numbers for all of the files currently in the file system is also generated. This list is sorted by inode number and the table and list are merged to provide a structure for determining which files are to be backed up. This means that relevant inodes and file names are now provided in a single entity. It is also noted that the structure that results from the merge operation is particularly suitable for being read in blocks which thus permits the backup operation to be carried out in parallel. The task of backing up files is also preferably partitioned by file size or other criteria as opposed to being partitioned simply by the number of files assigned to be backed up by any one processor in a distributed or parallel data processing system.

10 Claims, 2 Drawing Sheets

U.S. PATENT DOCUMENTS

| | | |
|---|---|---|
| 6,289,356 B1 | 9/2001 | Hitz et al. .................. 707/201 |
| 6,697,846 B1 * | 2/2004 | Soltis ........................ 709/217 |
| 2002/0123997 A1 | 9/2002 | Loy et al. ..................... 707/8 |
| 2002/0124013 A1 | 9/2002 | Loy et al. ................... 707/204 |
| 2002/0143734 A1 | 10/2002 | Loy et al. ...................... 707/1 |

* cited by examiner

PARALLEL HIGH SPEED BACKUP FOR A STORAGE AREA NETWORK (SAN) FILE SYSTEM

BACKGROUND OF THE INVENTION

The present invention is generally directed to a method and system for backing up file systems. More particularly, the present invention is seen to be especially useful in distributed or parallel data processing systems since its structure makes possible the partitioning of the backup process into a plurality of independent units. Even more particularly the present invention is particularly usable with Storage Area Networks in distributed or parallel data processing systems.

Advances in disk storage have created the capability of managing huge amounts of data and large numbers of files within a single file system. This creates a problem in producing normal backup copies of files in the network because of the difficulties associated with moving sufficient amounts of data and also because of the difficulty associated with identifying which files are to be backed up.

The traditional technique for backing up files involves running a backup application which can run in either full mode or in incremental mode. A full backup (that is, a backup running in full mode, also known as a base backup) backs up the entire file system to a single data sink by reading the entire name tree (see below for a more detailed discussion of the term "name tree" and "name space") and by transferring copies of each file. An incremental backup transfers new copies of the file for any file which has been created or changed and an incremental backup also makes note of files which have been deleted. Backup copies of deleted files are eventually deleted according to some policy mechanism (for example, retain the backup copy for one month).

There are two problems that exist in the above described situations that are addressed by the present invention: (1) the first problem is the serial nature of backup applications arising from the serial nature of the data and file transfer which unduly restricts data rates that would otherwise be possible; and (2) the second problem is the lack of the capability to rapidly determine which files actually require backing up. Existing techniques for file backup operations typically read the entire name space in the file system hierarchy and extract some file information about each file. This requires that a file system call be executed on every file in the file system. (In data processing systems following Posix file system standards, this call is effected by the "stat( )" command.) Since these calls require information stored on the disk and are done in file name order, they typically result in disk operations having a time "cost" of several milliseconds (ms) each. For example, a file system with 100 million files and a disk capable of reading the file information in 5 ms would require 133 hours to examine each file. Techniques have existed for backup by "inode" (see below for a description of this term which is widely employed to describe certain file system structures) since the early days of the development of the UNIX® operating system (Unix is a registered trademark of The Open Group), but these techniques suffer from the problem that the identity of the file is the inode number which is not a human usable identifier, as opposed to the file name itself which is, in general, recognizable by human file system users.

The only other solution known to these file backup problems exists in file systems which are based on continuous journaling of files that have been changed. However, this solution invokes a program exit every time a file is modified, deleted or renamed which then results in the creation of some form of log that represents the files which need to be backed up. This solution has the advantage that all required information is immediately available at backup time, but it has the cost disadvantage of continually appending information to the log. Furthermore, the appended record may be redundant for files modified more than once, a situation that happens very frequently.

For a better understanding of the environment in which the present invention is employed, the following terms are employed in the art to refer to generally well understood concepts. The definitions provided below are supplied for convenience and for improved understanding of the problems involved and the solution proposed and are not intended as implying variations from generally understood meanings, as appreciated by those skilled in the file system arts. Since the present invention is closely involved with the concepts surrounding files and file systems, it is useful to provide the reader with a brief description of at least some of the more pertinent terms. A more complete list is found in U.S. Pat. No. 6,032,216 which is assigned to the same assignee as the present invention. This patent is hereby incorporated herein by reference. The following glossary of terms from this patent is provided below since these terms are the ones that are most relevant for an easier understanding of the present invention:

Data/File System Data: These are arbitrary strings of bits which have meaning only in the context of a specific application.

File: A named string of bits which can be accessed by a computer application. A file has certain standard attributes such as length, a modification time and a time of last access.

Metadata: These are the control structures created by the file system software to describe the structure of a file and the use of the disks which contain the file system. Specific types of metadata which apply to file systems of this type are more particularly characterized below and include directories, modes, allocation maps and logs.

Directories: these are control structures which associate a name with a set of data represented by an inode.

Inode: a data structure which contains the attributes of the file plus a series of pointers to areas of disk (or other storage media) which contain the data which make up the file. An inode may be supplemented by indirect blocks which supplement the inode with additional pointers, say, if the file is large.

Allocation maps: these are control structures which indicate whether specific areas of the disk (or other control structures such as modes) are in use or are available. This allows software to effectively assign available blocks and inodes to new files. This term is useful for a general understanding of file system operation, but is only peripherally involved with the operation of the present invention.

Logs: these are a set of records used to keep the other types of metadata in synchronization (that is, in consistent states) to guard against loss in failure situations. Logs contain single records which describe related updates to multiple structures. This term is also only peripherally useful, but is provided in the context of alternate solutions as described above.

File system: a software component which manages a defined set of disks (or other media) and provides access to data in ways to facilitate consistent addition, modification and deletion of data and data files. The term is also used to describe the set of data and metadata contained within a specific set of disks (or other media). While the present invention is typically used most frequently in conjunction with rotating magnetic disk storage systems, it is usable with any data storage medium which is capable of being accessed by name with data located in nonadjacent blocks; accordingly, where the terms "disk" or "disk storage" or the like are employed herein, this more general characterization of the storage medium is intended.

Snapshot: a file or set of files that capture the state of the file system at a given point in time.

Metadata controller: a node or processor in a networked computer system (such as the pSeries of scalable parallel systems offered by the assignee of the present invention) through which all access requests to a file are processed. This term is provided for completeness, but is not relevant to an understanding of the operation of the present invention.

SUMMARY OF THE INVENTION

In accordance with a preferred embodiment of the present invention a method for backing up a file system comprises the steps of generating a list of modes, in inode number order, that have changed since a specified time. This list includes inode numbers and certain file attributes such as the size of the file and the time (including also the date) of the last file modification. A table which has names and inode numbers/generation numbers for all files currently in the file system is also generated. The list is sorted by inode number. The list and table are merged by inode number. Files are then backed up using the contents of the merged list and table to determine which files are to be backed up. While the files may be backed up in the order in which they appear in the merged entity, the specific order is not critical. As used herein the terms "list" and "table" are intended to encompass essentially the same linear structures; separate terms are employed to avoid references to less comprehensible notions such as "first list" and "second list."

In preferred embodiments of the present invention, the inode number also includes a generation number. The use of a generation number allows the same mode to be used after the deletion of a file. The old file is "inode X, generation N"; The new file is "inode X, generation N+1." In yet other aspects, the merged list and table is stored in its own file, referred to as a shadow name space file. The present invention also takes advantage of the existence and structure of the shadow name space file to access it in relatively large blocks. In this way the blocks may be partitioned and provided to various processing nodes in the system which thus results in a plurality of backup operations being carried out in parallel by at least two independent processors. The partitioning of the backup operation in this fashion is not limited to a simple linear division of files from the shadow name space file to be backed up. The partitioning can now readily be based upon a variety of file parameters, such as, but not limited to, estimated time for completion of file backup for files indicated in the partition.

Accordingly, it is an object of the present invention to provide a method for backing up large file systems.

It is also an object of the present invention to enhance the performance of backup for data in storage area networks (SANs).

It is a still further object of the present invention to provide a mechanism in which the backup process may be partitioned so as to be carried out in parallel at a plurality of data processing nodes.

It is another object of the present invention to provide a file backup system which is more amenable to file designation by the more human readable file names, as opposed to reference by mode number.

It is yet another object of the present invention to enhance the operation of both full mode and incremental node file backup procedures.

It is a further object of the present invention to provide a mechanism for backing up files to a single data sink or to a plurality of data sinks.

It is a still further object of the present invention to provide a file backup procedure which is consistent with file deletion policies, and especially with longer term deletion policies.

It is also an object of the present invention to avoid the usual serial nature of file backup procedures.

It is still another object of the present invention to rapidly determine which files are to be backed up and to carry out the backup by file name, thus retaining the ability to selectively restore individual files by file name.

It is yet another object of the present invention to avoid file backup procedures based on journaling.

It is also an object of the present invention to significantly decrease the time required for file system backup, especially in large, distributed data processing systems.

Lastly, but not limited hereto it is an object of the present invention to be able to quickly identify which files have changed, for back up purposes, in file systems with huge numbers of files, say for example, when the number of files is in the order of hundreds of millions.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
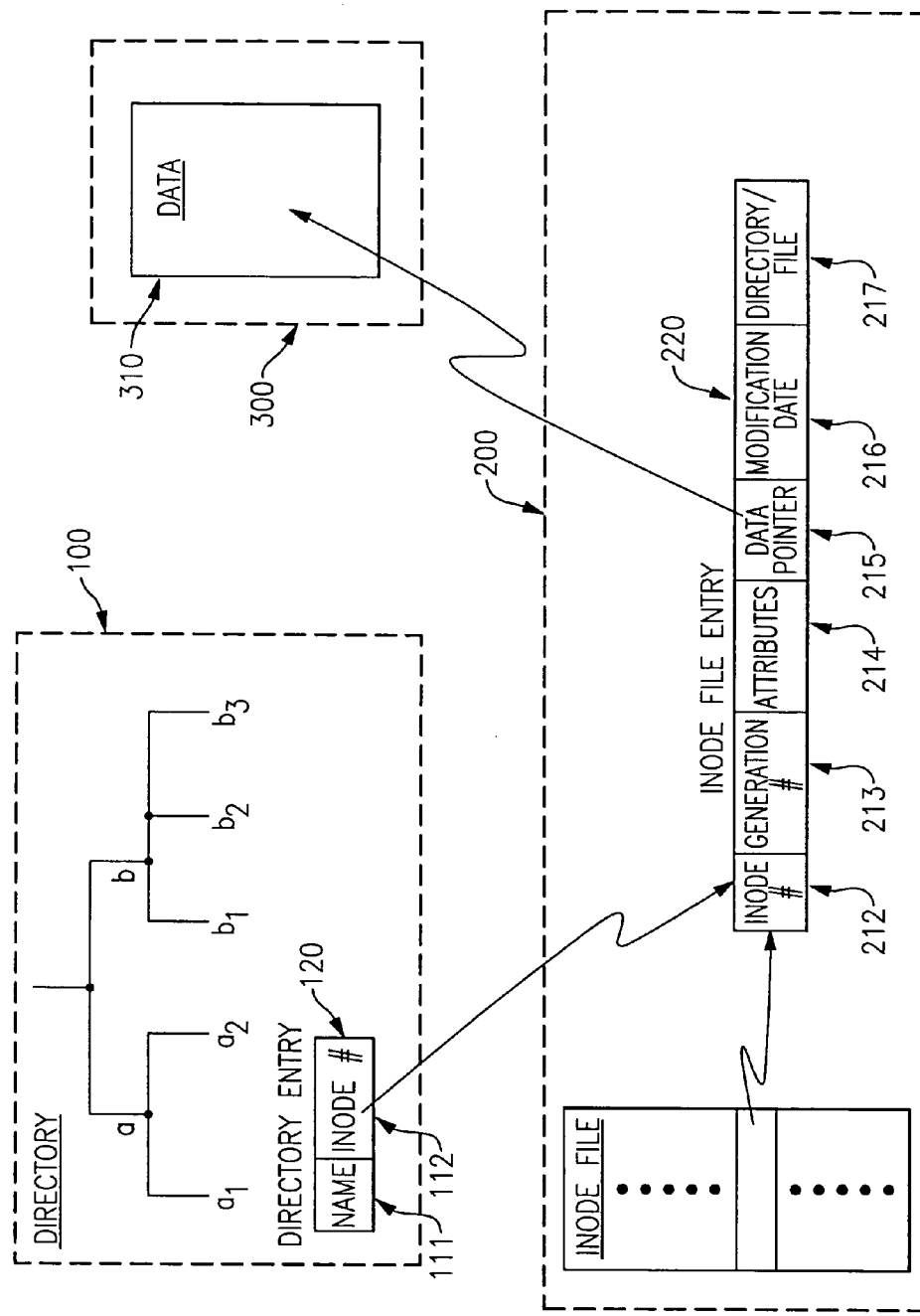
FIG. 1 is a block diagram illustrating file system structures exploited by the present invention.

In FIG. 1 illustrates the principle elements in a file system. A typical file system, such as the one shown, includes directory tree 100, inode file 200 and data 300. These three elements are typically present in a file system as files themselves. For example as shown in FIG. 1, inode file 200 comprises a collection of individual records or entries 220. There is only one inode file per file system. In particular, it is the one shown on the bottom of FIG. 1 and indicated by reference numeral 200. Entries in directory tree 100 include a pointer, such as field 112, which preferably comprises an integer quantity which operates as a simple index into inode file 200. For example, if field 112 contains a binary integer representing, say "10876," then it refers to the $10876^{th}$ entry in inode file 200. Special entries are employed (see reference numeral 216 discussed below) to denote a file as being a directory. A directory is thus typically a file in which the names of the stored files are maintained in an arbitrarily deep directory tree. With respect to directory 100, there are three terms whose meanings should be understood for a better understanding of the present invention. The directory tree is a collection of directories which includes all of the directories in the file system. A directory is a specific type of file, which is an element in the directory tree. A directory is a collection of pointers to inodes which are either files or directories which occupy a lower position in the directory tree. A directory entry is a single record in a directory that points to a file or directory. In FIG. 1, an exemplar directory tree is illustrated within function block 100. An exemplar directory entry contains elements of the form 120, as shown; but see also FIG. 3 for an illustration of a directory entry content for purposes of the present invention. While FIG. 1 illustrates a hierarchy with only two levels (for purposes of convenience) it should be understood that the depth of the hierarchical tree structure of a directory is not limited to two levels. In fact, there may be dozens of levels present in any directory tree. The depth of the directory tree does, nevertheless, contribute to the necessity of multiple directory references when only one file is needed to be identified or accessed. However, in all cases the "leaves" of the directory tree are employed to associate a file name (reference numeral 111) with entry 220 in inode file 200. The reference is by "inode number" (reference numeral 112) which provides a pointer into inode file 200. There is one inode array in file systems of the type considered herein. In preferred embodiments of the present invention the inode array is inode file 200 and the index points to the array element. Thus inode #10876 is the $10876^{th}$ array element in inode file 200. Typically, and preferably, this pointer is a simple index into inode file 200 which is thus accessed in an essentially linear manner. Thus, if the index is 108767, this points to the $10876^{th}$ record or array element of inode file 200. Name entry 111 allows one to move one level deeper in the tree. In typical file systems, name entry 111 points to, say inode #10876, which is a directory or a data file. If it is a directory, one recursively searches in that directory file for the next level of the name. For example, assume that entry 111 is "a," as illustrated in FIG. 1. One would then search the data of inode #10876 for the name entry with the inode for "a2." If name entry 111 points to data, one has reached the end of the name search. In the present invention, name entry 111 includes an additional field 113 (See FIG. 3) which indicates whether this is a directory or not. The directory tree structure is included separately because POSIX allows multiple names for the same file in ways that are not relevant to either the understanding or operation of the present invention.

Directory tree 100 provides a hierarchical name space for the file system in that it enables reference to individual file entries by file name, as opposed to reference by inode number. Each entry in a directory point to an inode. That inode may be a directory or a file. Inode 220 is determined by the entry in field 112 which preferably is an indicator of position in inode file 200. Inode file entry 220 in inode file 200 is typically, and preferably, implemented as a linear list. Each entry in the list preferably includes a plurality of fields: inode number 212, generation number 213, individual file attributes 214, data pointer 215, date of last modification 216 and indicator field 217 to indicate whether or not the file is a directory. Other fields not of interest or relevance to the present invention are also typically present in inode entry 220. However, the most relevant field for use in conjunction with the present invention is field 216 denoting the date of last modification. The inode number is unique in the file system. The file system preferably also includes generation number 213 which is typically used to distinguish a file from a file which no longer exists but which had the same inode number when it did exist. Inode field 214 identifies certain attributes associated with a file. These attributes include, but are not limited to: date of last modification; date of creation; file size; file type; parameters indicating read or write access; various access permissions and access levels; compressed status; encrypted status; hidden status; and status within a network. Inode entry 220 also includes entry 216 indicating that the file it points to is in fact a directory. This allows the file system itself to treat this file differently in accordance with the fact that it contains what is best described as the name space for the file system itself. Most importantly, however, typical inode entry 220 contains data pointer 215 which includes sufficient information to identify a physical location for actual data 310 residing in data portion 300 of the file system.

The present invention employs the combination of several capabilities to provide a backup functionality that is considerably faster than techniques used today, such as the ones described above. More particularly, the present invention provides the following capabilities:

(1) The capability of rapidly reading the inode file by block instead of by individual inode. This allows more efficient use of disk storage and also allows overlapping of the reading of inode entries across multiple disks. For example, it is now possible to read blocks of five hundred twelve inode entries in forty milliseconds and do this in parallel across one hundred disks resulting in a requirement for about eighty seconds instead of one hundred thirty three hours for the case in which there are 100 million inode entries. Published patent applications U.S. 2002/0124013 published on Sep. 5, 2002 (Ser. No. 09/887,533, filed Jun. 25, 2001) and U.S. 2002/0143734 published on Oct. 3, 2002 (Ser. No. 09/887,520, filed Jun. 25, 2001, and which is a divisional of Ser. No. 09/887,533; both applications filed based off of a provisional application Ser. No. 60/214,127, filed Jun. 26, 2000) and US 2002/0123997 published on Sep. 5, 2002 (Ser. No. 09/887,550, filed Jun. 25, 2001, based off of a provisional application Ser. No. 60/214,127, filed on Jun. 26, 2000) describe tools that provide the ability to present events from a parallel system to a hierarchical storage manager. Such tools are useful in handling the plurality of returned events provide to a storage manager. The patent applications referred to above are more relevant to a related invention submitted concurrently herewith, as described in U.S. patent application Ser. No. 10/602,157, but are cited here for completeness.

(2) The capability of rapidly reading the name space of the file system and rapidly creating what is, in effect, a shadow copy of the name space. The present invention also includes the capability of specifying the type of object named within each directory entry without a requirement to read the inode to determine the type. This allows the name space to be generated by only reading directory entries.

(3) The capability of sorting the directory entries so that they are ordered by inode number thus allowing a rapid translation from inode number to file name. It also allows the previous copy of the file system name space (a shadow name space file) to be compared with the current copy to detect renamed or deleted files in an expedient fashion.

(4) The capability of splitting the workload into pieces which results in approximately equal stresses on the backup target. This enables the workload to be split according to the size of the file and also to be split in accordance with the number of files and further allows the scheduling of "worker" threads to do the actual data movement to the backup target or targets.

(5) The capability of backing up data from the same portion of the file name space to the same backup target every time, or for it to migrate to other backup targets to better balance the backup workload.

It is assumed herein that there is a backup facility which accepts and stores backup copies of data. Tape management and cataloging features of such a facility are clearly important to the operation of the present invention; however, numerous examples of such products exist in today's marketplace. IBM's Tivoli Storage Manager is an example of one such product. IBM is also the assignee of the present invention.

Relevant portions of the structure of IBM's General Parallel File System (GPFS), which is similar in many ways to any file system conforming with the X-open standards for file systems, are now briefly considered in order to provide a context for a proper understanding of the present invention.

The starting point for the file system is a file system descriptor data structure, called the superblock, which resides at a known fixed point on the disks which comprise the file system. This structure is required in order to perform any action with respect to the file system. This structure has pointers to the disk location of two data structures which are key to understanding the present invention. The first of these data structure is inode file 200. The inode file is a collection of individual inodes which constitutes the data structure that describes the key properties of the file. Specifically relevant to the present invention, the entries in the inode file contain time stamps which reflect the last time that the file or its properties have been changed and it also indicates the size of the file. Note that the inode for a file does not contain the name of the file. The file names are stored in the file system's directory structure 100. Root directory 100 for the file system is the second key data structure addressed by the file system's superblock. The root directory is the starting point for finding a file by name. The root directory is structurally the same as any other directory: it contains a series of records composed of a name for a file or another directory, an inode number that points at an inode containing the properties of the file and (in GPFS) a target-type field that describes whether the target of the directory entry is a file or another directory. A file which is named rootdir/username/file is located by searching the directory called rootdir which points to the inode representing the directory called username. The directory called username contains the inode number of the file. In normal access operations, each directory in the path and its corresponding inode are accessed to find the data.

For a proper understanding of the advantages of the present invention is useful to more thoroughly understand the performance characteristics of these operations. A directory is a file in most UNIX or UNIX-like systems. Thus the read operation on a directory involves the reading of the directory's inode plus the reading of the appropriate directory blocks. Each of these operations involves a disk operation unless the access pattern and/or the amount of caching available allows the required data to be cached. The present invention is concerned about cases where the size of the file system and the requirement that the metadata be available to multiple systems make it unlikely that the required data is already cached. Furthermore, a directory scan closely resembles random access to the inode file. This makes is difficult to predict and to prefetch for future accesses. The disk operations required to scan the directories and read the inodes dominate performance.

There are two standard techniques used for backup. One of these techniques is "backup by inode." In this technique, one reads modes in bulk from the inode file and backs up the data associated with each inode file entry. The files are identified by inode number. This means that any attempt to restore an individual file by name involves significant custom programming that is not commonly done. The alternative and more common technique is to scan the file system name space looking for files which meet the backup criteria (for example, modified after a specified date). By using the name space, the program does an inquiry on each file in the entire name space. The standard interfaces to do this require a read of the directory entry and the inode for the file; this process requires separate disk operations. This pass through the entire name space is extremely time consuming for larger file systems.

Figure 2:
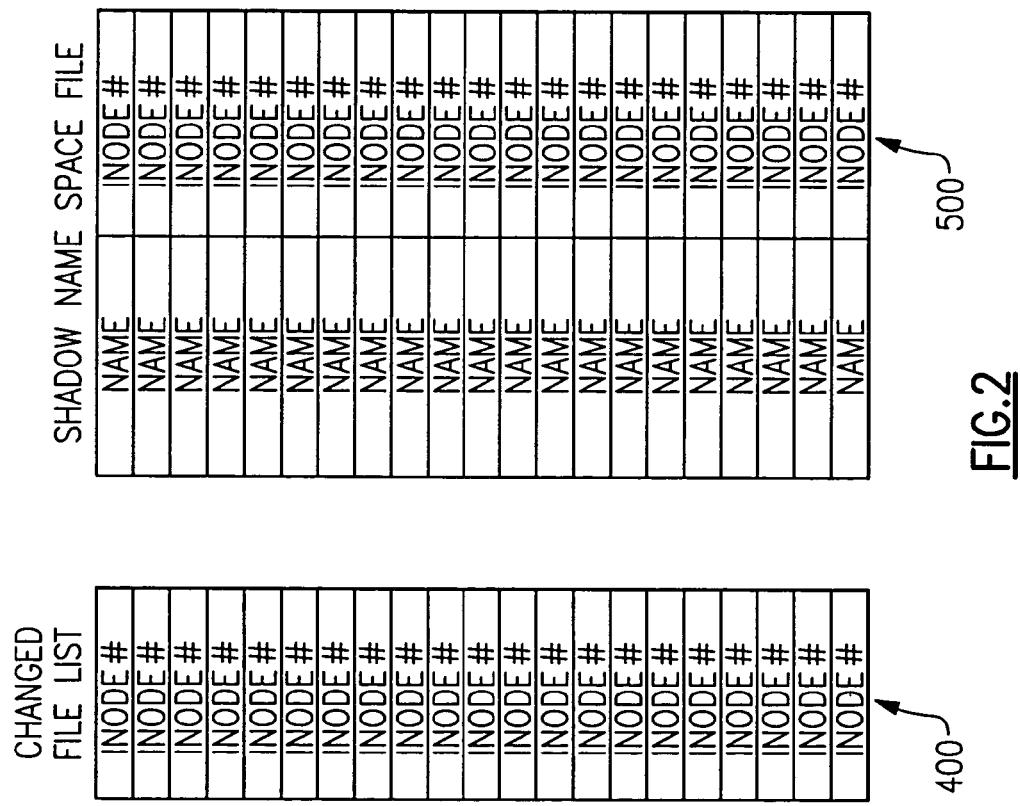
FIG. 2 is a block diagram illustrating the structure of two additional structures employable in conjunction with rapid and efficient backup operations which are now usable in a form which permits both the retrieval of large blocks of data structure descriptions and which also permits partitioning of the backup task into a plurality of independent operations.

As noted above, the present invention makes use of several process modifications to overcome the limitations of the backup methods described above. In particular, the present invention employs the following methods:

(1) In the present invention inode file 200 is read in much the same way as backup by inode does, generating list 400 (see FIG. 2) of inodes that have changed. This results in a list of inodes which meet the backup criteria. However, unlike backup by inode, the present invention does not do a backup using inode number as the key.

Figure 3:
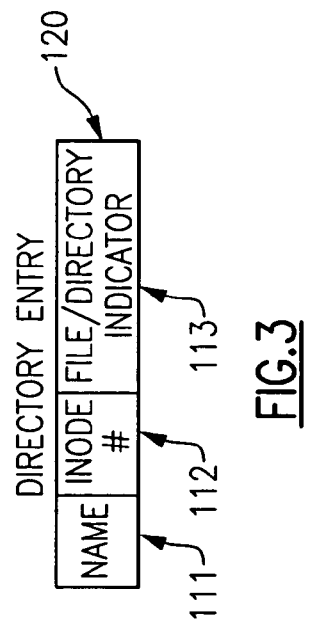
FIG. 3 is a block diagram illustrating a structure usable in a file system directory for distinguishing files and directory or subdirectory entries.

(2) In the present invention, an additional step is employed in which directory name space 100 is read to generate table 500 (see FIG. 2) of file names containing the name for every file in the file system together with its corresponding inode number. When reading the directory, the present invention employs the directory entry's newly provided target-type field 113 as seen in FIG. 3. Traditional file systems do not keep an indicator in the directory entry of whether or not the target is a directory or a file. That information is generally kept only in the inode file, hence the requirement for reading the inode. In the operation of the present invention field 113 is therefore provided so as to identify subdirectories without having to read every active inode, thus also providing one of the major advantages of the present method. The result of the directory scan is table 500 which has names and inode numbers for all files currently in the file system. This scan is taken either on the current active file system or on a snapshot of the file system.

(3) The present invention sorts resulting shadow name space table 500 by inode number. This allows one to easily merge name space table 500 with inode list 400, table thereby creating a list of file names that point to files that are to be backed up.

(4) The structure and content of the resulting merged table provides the present invention with the extra ability to divide the merged table into equal parts based on the number of files and on the size of each file and to then invoke a number of parallel backup job "worker threads" which perform the backup in parallel across multiple nodes of the file system (GPFS, for example). The division of the table into "equal" portions is done by estimating the time required by each file. The time estimate is preferably based on the following calculation (but note that the exact form of this calculation is not critical):

Time=base_time+(time/byte)*(number of bytes)

where, base_time is the estimated time required to backup a one byte file and time/byte is an estimate of the incremental time required to backup additional bytes. This aspect of the present invention, while preferable is optional.

(5) If the backup is to be spread across multiple backup repositories, it is desired that each file be sent to the same repository every time. On a base backup, the file name space is broken into approximately equal portions for each repository and a file remains associated with that repository until the next base backup. This mapping is preferably added to the original name space table. This aspect of the present invention, while preferable is also optional. The partitioning is carried out arbitrarily on a specified base backup. If one has n repositories, the shadow file is split into n pieces of approximately the same load as specified in item (4) above. One then employs m worker threads which move data to n repositories where m is ideally some multiple of n such that each repository is capable of completing the backup in a desired amount of time.

(6) The mapping from file names to backup repositories is preferably changed to allow the backup workload to be rebalanced. When the mapping changes, existing backup version of a file are preferably moved to their new repository, but it is not required. This aspect of the present invention, while preferable is optional as well.

(7) The name space table is saved for use in the next backup. By comparing the name space of the current backup with the prior backup, deleted and renamed files are easily detected and the correct backup action is taken according to standard backup policies. This aspect of the present invention, while preferable is also optional, particularly when considering the invention in its broadest scope.

The result of the above described process modifications is that the backup of large file systems becomes faster while still allowing the flexibility of backup by name. In order to more fully appreciate the advantages of the present system and method, specific examples are considered below. For each of these examples a disk seek time of 5 milliseconds is assumed; this is a typical seek time for today's disk drives.

For example, for a file system with 10 disks containing 10 million files of size 100,000 bytes and 10,000 directories with only 5% of the files changed since the previous backup, the following performance difference is noted:

Prior Art Backup Techniques Employing Backup by Name

Ten million inode "reads" at 5 milliseconds each results in over 13 hours to determine which files have changed; 10,000 directories need to be read to get names.

Backup Techniques Employing the Present Invention

The inode file is read in larger units. Furthermore, the access to the inode file is sequential, allowing the inodes to be read in advance and in parallel. In this example, the modes are read in units of 512 in parallel from all 10 disks. Each read of 512 inodes takes place in about 50 milliseconds with 10 way parallelism. This is a read rate of about 100,000 inodes/sec allowing the 10 million inodes to be read in less than 2 minutes. The directory read performance is the same as the previous case. This performance gain is further improved by the ability to backup in parallel using multiple worker threads sending the backup data to multiple repositories.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A computer implemented method for backing up a file system comprising the steps of:
   generating a list of inodes, in inode number order, that have changed, said list including inode numbers;
   generating a table which has names and inode numbers for all files currently in the file system;
   sorting said table by inode number;
   merging said list and said table by inode number, whereby inodes that have changed and file names associated with the modes that have changed are provided in a single entity; and
   backing up files based on said merged list and table to provide backed-up files.

2. The method of claim 1 in which said inode number also includes a generation number.

3. The method of claim 1 further including the step of storing said merged list and table in said merged list and table's own file, referred to as a shadow name space file.

4. The method of claim 3 further including the step of accessing said shadow name space file in blocks.

5. The method of claim 4 in which said blocks are partitioned and said backing up is performed by at least two independent processors with each processor backing up files indicated in said partition.

6. The method of claim 5 in which said partitioning is based upon estimated time for completion of file backup for files indicated in said partition.

7. The method of claim 1 in which said backup is carried out in the same order as indicated in said merged list and table.

8. The method of claim 1, wherein the generating of the list of modes is performed at back-up time, instead of at application processing time to avoid at least one of overhead in logging changes at execution of each application and redundant entries for files that are modified multiple times.

9. At least one program storage device readable by at least one computer, tangibly embodying at least one program of instructions executable by the at least one computer to perform a method for backing up a file system, said method comprising:

generating a list of inodes, in inode number order, that have changed, said list including inode numbers;

generating a table which has names and inode numbers for all files currently in the file system;

sorting said table by inode number;

merging said list and said table by inode number, whereby inodes that have changed and file names associated with the modes that have changed are provided in a single entity; and backing up files based on said merged list and table to provide backed-up files.

10. A data processing system comprising:

a central processing unit;

a random access memory for storing data and programs for execution by said central processing unit;

a nonvolatile storage device;

program means, for file system backup, stored within said memory for (1) generating a list of inodes, in inode number order, that have changed, said list including associated inode numbers; (2) generating a table which has names and inode numbers for all files currently in the file system; (3) sorting said table by inode number; (4) merging said list and said table by inode number, whereby inodes that have changed and file names associated with the inodes that have changed are provided in a single entity; and (5) backing up files based on said merged list and table.

* * * * *